United States Patent [19]

Kirchmeyer et al.

[11] Patent Number: 5,811,480
[45] Date of Patent: Sep. 22, 1998

[54] SIZE COMPOSITION, SIZED GLASS FIBERS AND USE THEREOF

[75] Inventors: Stephan Kirchmeyer, Leverkusen; Alexander Karbach, Krefeld, both of Germany; Raymond Audenaert, Antwerpen, Belgium

[73] Assignees: Bayer Aktiengesellschaft, Leverkusen, Germany; Bayer Antwerpen N.V., Antwerpen, Belgium

[21] Appl. No.: 671,475

[22] Filed: Jun. 27, 1996

[30] Foreign Application Priority Data

Jun. 28, 1995 [DE] Germany ................ 195 23 512.6

[51] Int. Cl.⁶ ........................................ C08J 5/10
[52] U.S. Cl. ..................... 524/287; 524/296; 524/298; 524/300; 523/206; 428/391; 428/392
[58] Field of Search ..................... 428/392, 391, 428/378; 523/206; 524/296, 298, 300, 287

[56] References Cited

U.S. PATENT DOCUMENTS

| | | |
|---|---|---|
| 3,249,412 | 5/1966 | Kolek et al. . |
| 3,449,281 | 6/1969 | Sullivan et al. . |
| 3,997,306 | 12/1976 | Hedden . |
| 4,250,263 | 2/1981 | Winans . |
| 4,448,917 | 5/1984 | Black et al. . |
| 4,451,592 | 5/1984 | Black et al. . |
| 4,487,797 | 12/1984 | Watson . |
| 4,489,131 | 12/1984 | Black et al. . |
| 4,615,946 | 10/1986 | Temple . |
| 4,659,753 | 4/1987 | Tiburtius et al. . |
| 5,086,101 | 2/1992 | Garrett et al. . |

FOREIGN PATENT DOCUMENTS

| | | |
|---|---|---|
| 0027942 | 5/1981 | European Pat. Off. . |
| 0311894 | 4/1989 | European Pat. Off. . |

OTHER PUBLICATIONS

Houben–Weyl, Methoden der organischen Chemie, H. Barte et al.., eds., vol. E 20 pp. 1587–1604,1659–1681, and 1688–1689, Georg Thieme Verlag, NY (1987).

Derwent Abstracts, AN–95–078561, abstract of JP 07–3,646 (1995).

Derwent Abstracts, AN 94–239388, abstract of JP 06–173, 166 (1994).

*Primary Examiner*—William Krynski
*Assistant Examiner*—J. M. Gray
*Attorney, Agent, or Firm*—Sprung Kramer Schaefer & Briscoe

[57] ABSTRACT

Size compositions for glass fibers which contain, in addition to polyepoxide, polyester or polyurethane film formers; amino - or epoxysilanes, or both; monomeric, aromatic di- or polycarboxylic acids and conventional size components.

2 Claims, No Drawings

SIZE COMPOSITION, SIZED GLASS FIBERS AND USE THEREOF

The present invention relates to size compositions, to sized glass fibers and to the use thereof.

BACKGROUND OF THE INVENTION

It is known that the properties of composites made from glass fibers and polymers are to a great extent influenced by the shear strength between the glass fibers and the polymers surrounding the glass fibers, the so-called matrix polymers. The task of a glass fiber size is to create adhesion between the glass fibers and the matrix, and simultaneously to ensure the production and processing properties of the glass fibers. The sizes used are compositions prepared from water, a polymeric binder (the so-called film former), a coupling agent, lubricants, anti-static agents and further auxiliary substances. Generally, the binders used are organic, water-dispersible or soluble polyvinyl acetate, polyester, polyester epoxide, polyurethane, polyacrylate, polyolefin resins or mixtures thereof.

In general, the film former and coupling agent are selected in such a manner that there is an affinity between the polymer matrix and the film former and that a mechanical bond is created between the glass fiber and polymer matrix. Obviously, therefore, size formulations must be optimized for the particular polymer matrix and the properties of the composites are sensitive to changes in size composition.

A fundamental problem is the ageing of the glass fiber and polymer matrix composite under the action of heat, light or hydrolysis, which results, for example, in discoloration and a decrease in mechanical strength under the action of moisture. Ageing discoloration is particularly undesirable in unpigmented, glass fiber reinforced polymer formulations. Due to the many chemical species present in glass fiber and polymer matrix composites and due to the many possible mechanisms of discoloration, for example by hydrolysis, thermal or photochemical degradation, it is possible to solve the problem of discoloration only with difficulty. An attempt is made in EP-B 28 942 to minimize the problem of hydrolysis sensitivity by establishing a balance of hydrophilic/hydrophobic properties in the film former. It is proposed in EP-B 201 691 to improve the mechanical ageing resistance of glass fiber reinforced, thermoplastic polyesters by combining epoxide and polyurethane film formers with two different silanes together with a lubricant of a particular structure. Discoloration is, however, unaffected by these measures.

The object of the present invention is thus to provide glass fibers which, in terms of their general properties, i.e. for example mechanical and thermal properties in the polymer composite, at least achieve or exceed those of hitherto available glass fibers, but which are simultaneously distinguished by improved ageing behavior, in particular with regard to discoloration.

It has surprisingly proved possible to achieve this object with size compositions or with sized glass fibers produced therewith, which contain, in addition to polyepoxide, polyester or polyurethane film formers, amino- and/or epoxysilanes and further conventional size constituents, monomeric, aromatic di- or polycarboxylic acids.

The present invention provides size compositions for glass fibers consisting of a) 2 to 20 wt. %, preferably 4 to 10 wt. %, of polyepoxide, polyester, polyvinyl acetate or polyurethane film formers, b) 0.1 to 10 wt. %, preferably 0.3 to 2 wt. %, of organo-functional silanes, c) 0.1 to 20 wt. %, preferably 0.5 to 5 wt. %, of monomeric, aromatic di- or polycarboxylic acids, d) 0 to 10 wt. %, preferably 0.1 to 5 wt. %, of further conventional size constituents which contain no polyolefin dispersions or emulsions and e) water to make up to 100 wt. %.

DESCRIPTION OF THE PREFERRED EMBODIMENTS

Component (c) is preferably terephthalic acid or isophthalic acid.

The present invention also provides sized glass fibers which are coated with the dried residue of the size compositions according to the invention.

The sized glass fibers according to the invention are used to reinforce thermoplastic and thermoset polymers, preferably thermoplastic, aromatic polyesters.

The ageing resistance of the sizes according to the invention or of the glass fibers sized therewith in the composite is all the more surprising as monomeric, aromatic di- or polycarboxylic acid have not hitherto been known to stabilize ageing behavior and such an effect was also not to be expected by the person skilled in the art. To the contrary, EP-A 27 942 even gives a warning and advises against incorporating excessive quantities of hydrophilic constituents into the size as the glass fiber and polymer matrix composite is disrupted by the so-called "wicking effect". It was thus not at all to be expected that the glass fibers sized with the sizes according to the invention would have particularly good to excellent ageing behavior in the composite. It may instead have been assumed that the glass fibers according to the invention would have a generally poorer range of properties in the polymer composite than those hitherto used. This is, however, not the case. The glass fibers according to the invention are distinguished by having an at least equivalent range of properties in comparison with known glass fibers and moreover have improved ageing behavior, in particular with regard to discoloration.

Glasses suitable for the production of the sized glass fibers according to the invention are both those grades known for glass silk production, such as E-, A-, C- and S-glass, and known glass staple fiber products. Among the stated grades of glass for the production of continuous glass fibers, E-glass fibers are the most significant for reinforcing plastics due to their zero alkali content, their elevated tensile strength and their elevated modulus of elasticity.

For the purposes of sizing, the glass fibers are provided, using known methods, with the size according to the invention consisting of a) 2 to 20 wt. %, preferably 4 to 10 wt. %, of polyepoxide, polyester, polyvinyl acetate or polyurethane film formers, b) 0.1 to 10 wt. %, preferably 0.3 to 2 wt. %, of organo-functional silanes, c) 0.1 to 20 wt. %, preferably 0.5 to 5 wt. %, of monomeric, aromatic di- or polycarboxylic acids, d) 0 to 10 wt. %, preferably 0.1 to 5 wt. %, of further conventional size constituents which contain no polyolefin dispersions or emulsions and e) water to make up to 100 wt. %, and then dried.

The size may contain further components such as emulsifiers, further film-forming resins, further coupling agents, lubricants and auxiliary substances such as wetting agents or anti-static agents. The further coupling agents, lubricants and other auxiliary substances, processes for the production of the sizes, processes for sizing and further processing glass fibers are known and described, for example, in K. L. Loewenstein, *The Manufacturing Technology of Continuous Glass Fibers,* Elsevier Scientific Publishing Corp., Amsterdam, London, New York, 1983. The glass fibers may be sized by any desired methods, for example using suitable devices, such as for example spray or roller applicators. Size may be applied onto the glass filaments drawn at high speed from spinnerets immediately once they have solidified, i.e. before winding. It is, however, also possible to size the fibers by immersion in a bath after the spinning process.

Suitable polyepoxide film formers are epoxide resins dispersed, emulsified or dissolved in water. These are epoxide resins which are unmodified or modified by amines, acid groups or hydrophilic non-ionic groups and are based on diglycidyl ethers of dihydric phenols such as pyrocatechol, resorcinol, hydroquinone, 4,4'-dihydroxydiphenyldimethylmethane (bisphenol A), 4,4'-dihydroxy-3,3'-di-methyldiphenylpropane, 4,4'-dihydroxydiphenylsulphone, glycidyl esters of dibasic aromatic, aliphatic and cycloaliphatic carboxylic acids, such as for example phthalic anhydride bisglycidyl ether or adipic acid bisglycidyl ether, glycidyl ethers of dihydric, aliphatic alcohols such as butanediol bisglycidyl ether, hexanediol bisglycidyl ether or polyoxyalkylene glycol bisglycidyl ethers together with polyglycidyl ethers or polyhydric phenols, for example of novolaks (reaction products of mono- or polyhydric phenols with aldehydes, in particular formaldehyde, in the presence of acid catalysts), tris-(4-hydroxyphenyl)methane or 1,1,2,2-tetra(4-hydroxyphenyl) ethane, epoxide compounds based on aromatic amines and epichlorohydrin, for example tetraglycidylmethylenedianiline, N-diepoxypropyl-4-aminophenylglycidyl ether, glycidyl esters of polybasic aromatic, aliphatic and cycloaliphatic carboxylic acids, glycidyl ethers of polyhydric alcohols, for example of glycerol, trimethylolpropane and pentaerythritol and further glycidyl compounds such as trisglycidyl isocyanurate. Suitable chemical modifications are, for example, the addition of amines or the addition of hydrophilic polyethers, for example polyethylene glycols. Suitable polyepoxide dispersions are described, for example, in EP-A 27 942, EP-A 311 894, U.S. Pat. Nos. 3,249,412, 3,449,281, 3,997,306 and 4,487,797. Polyester epoxides based on bisphenol A and novolaks and dispersed, emulsified or dissolved in water are preferred.

Polyurethane film formers are reaction products of preferably difunctional polyisocyanates with preferably difunctional polyols and optionally preferably difunctional polyamines which are dispersed, emulsified or dissolved in water. The synthesis of polyurethane dispersions, usable structural units, the production process and the properties thereof are known to the person skilled in the art and are described, for example, in Houben-Weyl *Methoden der organischen Chemie,* volume E 20, edited by H. Bartl and J. Falbe, Georg Thieme Verlag, Stuttgart, New York, 1987 on pages 1587 to 1604, 1659 to 1681, 1686 to 1689.

Suitable isocyanates are aliphatic, cycloaliphatic, araliphatic, aromatic and heterocyclic polyisocyanates or any desired mixtures of these polyisocyanates, such as for example 1,6-hexamethylene diisocyanate, 1-isocyanato-3,3, 5-trimethyl-5-isocyanatomethylcyclohexane, 2,4- and 2,6-tolylene diisocyanate, diphenylmethane 2,4'- and/or 4,4'-diisocyanate.

Suitable polyols are polyesters, thus, for example, reaction products of preferably dihydric polyalcohols, such as for example ethylene glycol, propylene glycol, butylene glycol and hexanediol with preferably dibasic polycarboxylic acids or the esterifiable derivatives thereof, such as for example succinic acid, adipic acid, phthalic acid, phthalic anhydride, maleic acid and maleic anhydride. Polyesters prepared from lactones, for example P-caprolactone, may also be used. Polyethers produced, for example, by polymerization of epoxides, such as for example ethylene oxide, propylene oxide or tetrahydrofuran with themselves or by addition of the epoxides onto starter components with reactive hydrogen atoms, such as water, alcohols, ammonia or amines are also suitable.

Particularly preferred so-called chain extenders, i.e. preferably difunctional polyols or polyamines with a molecular weight of less than 400, are: dihydric polyalcohols such as ethylene glycol, propylene glycol, butylene glycol, aminoalcohols such as ethanolamine, N-methyldiethanolamine, as well as difunctional polyamines such as, for example, ethylenediamine, 1,4-tetramethylenediamine, hexamethylene-diamine, 1-amino-3,3,5-trimethyl-5-aminomethylcyclohexane, bis-(3-aminopropyl)-methylamine and hydrazine.

Polyurethane dispersions, emulsions or solutions having epoxide groups or capped isocyanate groups (for example EP-A 137 427) are also suitable.

Polyester dispersions are preferably reaction products prepared from the above-stated polyepoxides with the above-stated polycarboxylic acids, or polyesters containing carboxyl groups (for example EP-A 27 942) which no longer contain epoxide groups. The phenoxy resins described in U.S. Pat. No. 5 086 101 are also included among the polyesters and are suitable.

Suitable organo-functional silanes (b) are, for example, 3-aminopropyltrimethoxysilane, 3-aminopropyltriethoxysilane, 3-aminopropyltrismethoxyethoxysilane, 3-aminopropylmethyldiethoxysilane, N-2-aminoethyl-3-aminopropyltrimethoxysilane, N-2-aminoethyl-3-aminopropylmethyldimethoxysilane and N-methyl-3-aminopropyltrimethoxysilane, 3-glycidyloxypropyltrimethoxysilane, 3-methacryloxypropyltrimethoxysilane, 3-mercaptopropyltrimethoxysilane, vinyltriethoxysilane or vinyltrimethoxysilane.

Suitable aromatic di- or polycarboxylic acids (c) are, for example, optionally substituted phthalic acids, isophthalic acids, terephthalic acids, benzenetricarboxylic acids, benzenetetracarboxylic acids, naphthalenedi-, -tri- and -tetracarboxylic acids, phenyldiacetic acids and cinnamic acids, together with anhydrides of these acids.

The sizes may additionally contain further size components (d) such as anionic, cationic or non-ionic emulsifiers, further film forming resins, lubricants, such as for example polyalkylene glycol ethers of fatty alcohols or fatty amines, polyalkylene glycol esters and glycerol esters of fatty acids with 12 to 18 C atoms, polyalkylene glycols of higher fatty acid amines with 12 to 18 C atoms of polyalkylene glycols and/or alkenylamines, quaternary nitrogen compounds, for example ethoxylated imidazolinium salts, mineral oils or waxes and auxiliary substances such as wetting agents or anti-static agents such as, for example, lithium chloride or ammonium chloride. These further auxiliary substances are known to the person skilled in the art and described, for example, in K. L. Loewenstein, *The Manufacturing Technology of Contintious Glass Fibers,* Elsevier Scientific Publishing Corp., Amsterdam, London, New York, 1983.

Size component (d) contains no polyolefin dispersions or emulsions.

The glass fibers according to the invention are suitable as reinforcing fibers for thermoplastic polymers such as, for example, polycarbonate, nylon-6 and nylon-6,6, aromatic polyesters such as polyethylene terephthalate and polybutylene terephthalate, polyurethanes or polyarylene sulphides together with thermoset polymers such as unsaturated polyester resins, epoxide resins and phenol/formaldehyde resins.

The glass fibers according to the invention are preferably used as reinforcing fibers for aromatic polyesters, very particularly preferably for polyethylene terephthalate and polybutylene terephthalate.

The use of the glass fibers according to the invention to reinforce polyolefins is less preferred.

The following examples are intended to illustrate the invention in greater detail.

EXAMPLES

Examples 1 and 2 (production of the sized glass fibers according to the invention) and Comparative Example Sizes (see Table 1) are applied with a kiss-roll applicator onto glass fibers of a diameter of 10 $\mu$m. The glass fibers are wound into cakes (reels) and then dried for 10 hours at 130° C. Once dry, the glass fibers are chopped into 4.5 mm lengths.

TABLE 1

| Size components<br>Quantities stated in wt.% | Example 1 | Example 2 | Comparison |
|---|---|---|---|
| Epoxide dispersion according to EP-A 27942, Example 3a | 4.5 | 4.5 | 4.5 |
| Polyurethane dispersion (BAYBOND ® PU 0401, commercial product of Bayer AG, Leverkusen) | 1.5 | 1.5 | 1.5 |
| 3-Aminopropyltriethoxysilane | 0.5 | 0.5 | 0.5 |
| 3-Glycidyloxypropyttrimethoxysilane | — | 0.5 | 0.5 |
| Terephthalic acid | 2.2 | 0.5 | — |
| Lubricant (polyalkylene glycol) | 0.5 | 0.5 | 0.5 |
| Water | 90.8 | 92.0 | 92.5 |
| Applied quantity of size (determined by ignition loss) | 0.88 | 0.82 | 0.80 |

Example 3 (Use of the sized glass fibers according to the invention)

70 parts by weight of polybutylene terephthalate (POCAN® 1200, commercial product of Bayer AG, Leverkusen) and 30 parts by weight of glass fibers from Examples 1 and 2 and the comparative example are converted into a molding composition in an extruder at an extruder temperature of 250° C. and pelletized. 80×10×4 mm test bars and tensile bars are produced from the molding compositions on a conventional injection molding machine. The bars are tested for flexural strength to DIN 53 452, tensile strength to DIN 53 455 and Izod impact strength at room temperature (ISO 180/IC).

Injection moldings are stored at 180° C. in an air atmosphere (hot air ageing). At defined intervals, the difference in lightness in comparison with an unaged specimen is determined to DIN 5033.

TABLE 2

| Use of | Flexural strength in [MPa] | Tensile strength in [MPa] | Impact strength in [kJ/m$^2$] |
|---|---|---|---|
| Glass fibers from Example 1 | 253 | 163 | 52 |
| Glass fibers from Example 2 | 248 | 160 | 49 |
| Glass fibers from comparative example | 245 | 160 | 49 |
| Conventional commercial glass fibers recommended for reinforcing polybutylene terephthalate | 243 | 158 | 48 |

TABLE 3

(Hot air ageing)
Difference in lightness relative to an unaged specimen to DIN 5033
(positive values: specimen is lighter than comparison specimen,
negative values: specimen is darker than comparison specimen)

| [Hours] | Example 1 | Example 2 | Comparison | Conventional commercial glass fibers |
|---|---|---|---|---|
| 0 | 0 | 0 | 0 | 0 |
| 9 | −2.6 | −2.9 | −3.2 | −7.1 |
| 25 | −4 | −4.1 | −5.5 | −11.1 |
| 120 | −6.8 | −7.5 | −10.4 | −17.2 |
| 200 | −7.7 | −8.3 | −12.1 | −19.6 |
| 500 | −11.2 | −11.3 | −15.7 | −21.5 |
| 800 | −12.5 | −13.4 | −17.9 | −22.9 |
| 1632 | −15.5 | −16.9 | −19.9 | −24.7 |
| 2020 | −15.2 | −16.5 | −20.2 | −24.2 |
| 2480 | −16.1 | −17.2 | −20.3 | −23.4 |

It will be appreciated that the instant specification and claims are set forth by way of illustration and not limitation, and that various modifications and changes may be made without departing from the spirit and scope of the present invention.

We claim:

1. A size composition for glass fibers consisting essentially of
   a) 4 to 10% by weight of at least one polyepoxide, polyester, polyvinyl acetate or polyurethane film former,
   b) 0.3 to 2% by weight of at least one organo-functional silane,
   c) 0.5 to 5% by weight of at least one member selected from the group consisting of optionally substituted phthalic acids, isophthalic acids, terephthalic acids, benzenetricarboxylic acids, benzenetetracarboxylic acids, naphthalenedi-, -tri- and -tetracarboxylic acids, phenyldiacetic acids and cinnamic acids, and their anhydrides,
   d) 0.1 to 5% by Weight of at least one further conventional size constituent which contains no polyolefin dispersion or emulsion and
   e) water to make up to 100 wt. %.

2. A size composition according to claim 1, wherein the component (c) comprises at least one of terephthalic acid and isophthalic acid.

* * * * *